United States Patent Office 2,754,464
Patented July 10, 1956

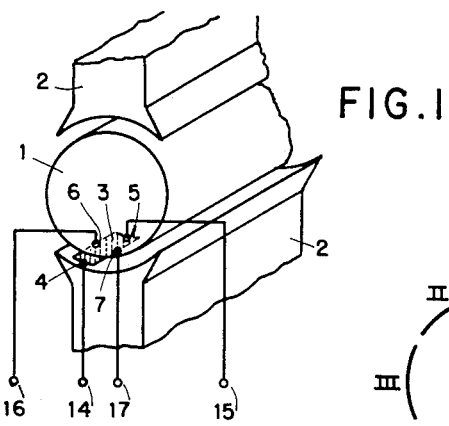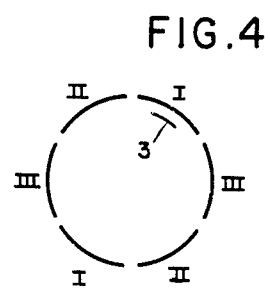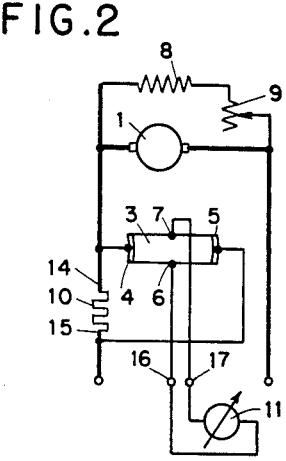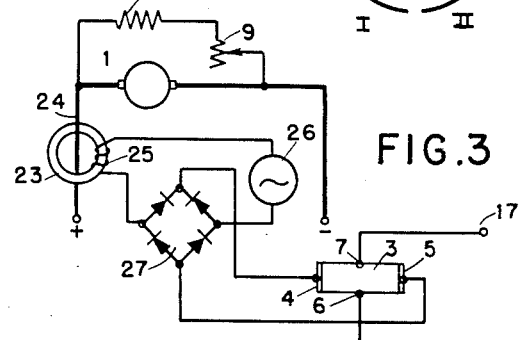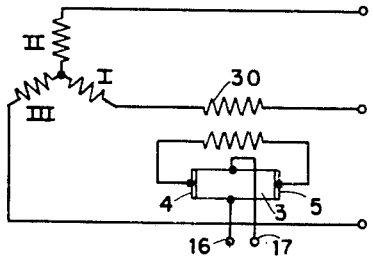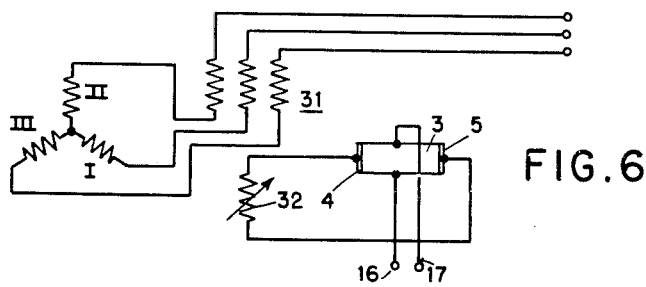

2,754,464

MEASURING AND CONTROL DEVICE FOR DYNAMOELECTRIC MACHINES

Leopold Wizenez, Berlin-Steglitz, Ferdinand Fraunberger, Berlin, and Friedrich Kuhrt, Nurnberg, Germany, assignors to Siemens-Schuckertwerke Aktiengesellschaft, Berlin-Siemensstadt, Germany, a German corporation Application January 13, 1955, Serial No. 487,277

Claims priority, application Germany January 13, 1954

9 Claims. (Cl. 318—434)

Our invention relates to devices on dynamo-electric machines for performing a measuring, indicating, controlling or regulating operation in response to a physical operating condition of the machine, and—in a particular aspect—to devices for measuring, or otherwise responding to, the torque of such a machine.

It is an object of the invention to provide a device for torque-proportional or similarly responsive operation that, in conjunction with an electric machine, secures a more rapid response and requires less space on the machine or its shaft than the torque-measuring means heretofore available, while also affording utmost simplicity and reliability of its condition-responsive sensing means.

To this end, and in accordance with a feature of our invention, we subject a semiconductor member equipped with Hall electrodes to the magnetic field of an electric machine and pass through the member a current derived from, or controlled by, the electric load circuit of the machine so as to be substantially proportional to the load current of the machine; and we apply the voltage, thus generated between the Hall electrodes of the semiconductor member, for performing the desired indicating, controlling or regulating operation.

The invention is predicated on the known phenomenon that a semiconductor traversed by current and simultaneously subjected to a magnetic field in a direction perpendicular to that of the current flow will generate a voltage, the so-called Hall voltage, between two electrodes that are in contact with the semiconductor and are spaced from each other in a direction transverse or perpendicular to both the current-flow direction and the field direction. It has been proposed to use such a device for measuring the strength of a magnetic field by passing a constant current through the semiconductor. In that case, the Hall voltage is proportional to the strength of the magnet field being measured.

Since according to the present invention such a semiconductor device is disposed in the field of a dynamoelectric machine and is traversed by current varying with the load current of that machine, the Hall voltage varies not only with the machine field but is also dependent upon load variations. The dual dependence is such that the Hall voltage is proportional to the product of magnetic field strength times load current. Since further the torque of a dynamoelectric machine is proportional to the same product, the Hall voltage thus generated is proportional to the torque and is available, for instance, for torque-measuring purposes or for performing a control or regulating operation in response to changes in torque.

According to a more specific feature of the invention, therefore, the Hall electrodes of the above-described device are connected, directly or through amplifying means, to an indicating or recording measuring instrument; or, according to another feature of the invention, the torque-responsive Hall voltage is used, directly or upon amplification, for the control or regulation of any desired operating condition of the same dynamo-electric machine or of any apparatus or machine operatively associated therewith.

The invention is applicable not only to direct-current machines but also to alternating single-phase or multi-phase machines; in the latter case, the current to be passed through the semiconductor member should be proportional to the active load-current component relating to the E. M. F. of the machine.

For subjecting the semiconductor to the machine field, in accordance with another feature of the invention, the member is permanently mounted into the magnetic circuit of the machine, for instance, in the air gap between stator and rotor. The current flowing through the semiconductor may be kept proportional to the load current of the machine either by passing that load current, or part thereof, through the member or by energizing the member indirectly from the load circuit, for instance, by the voltage drop across a series resistor or through a transformer or a direct-current transforming device. In all these cases, the Hall voltage, depending as to magnitude upon the field as well as upon the load current of the machine, is proportional to the machine torque and responds instantaneously to changes in field strength and current, so that the device combines a mechanically simple and entirely static design with inertia-free sensing operation.

The above-mentioned and other objects, advantages and features of the invention will be apparent from and will be set forth in the following description in conjunction with the drawings, in which—

Fig. 1 shows schematically and in perspective a direct-current machine equipped with a semi-conductor member to form part of a device according to the invention.

Figs. 2 and 3 show different embodiments of schematic circuit diagrams applicable with the machine assembly according to Fig. 1.

Fig. 4 is an explanatory diagram relating to the positioning of a semiconductor member in the field of an alternating current multi-phase machine.

Figs. 5 and 6 show two different embodiments of circuit dagrams for multi-phase machines.

Figure 7:
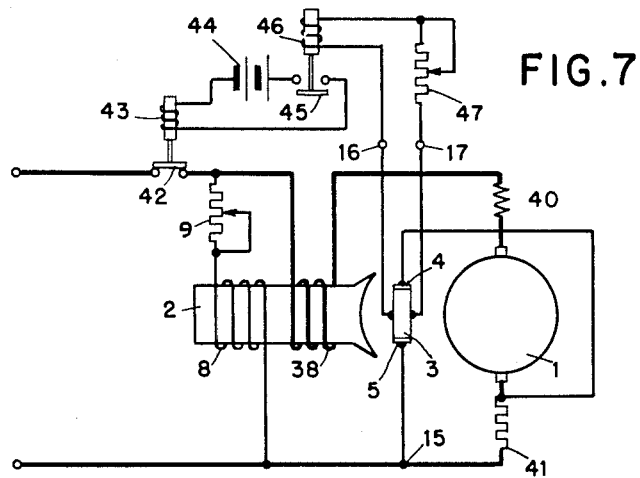
Fig. 7 is a schematic circuit diagram of a torque-limiting control system according to the invention.

In Fig. 1 a direct-current machine is represented by its armature 1 and by the iron structures 2 of one of the field poles of the machine. A semiconductor member 3 is disposed in the air gap of the machine between the armature 1 and one of the pole shoes 2. The semiconductor member 3 consists of a flat body or wafer of semiconductor material. It may be formed of a single crystal of indium antimonide, indium arsenide, gallium arsenide, aluminum arsenide, or any of the high-mobility semiconductor materials mentioned in a later place. The member 3 may have rectangular shape, for instance of 8 to 15 mm. length, 3 to 8 mm. width, and 0.1 to 0.5 mm. thickness. The short edges of the semiconductor member are contacted by terminals 4 and 5. Two electrodes 6 and 7, the so-called Hall electrodes, are in contact with the semiconductor body at two places located between, and spaced from, the terminals 4 and 5. The Hall electrodes are preferably located on two equipotential points when the semiconductor is traversed by current but is not subjected to a magnetic field. The terminals 4, 5 and the electrodes can be joined with the semiconductor body by first depositing upon the body at the proper places a thin metal coating, for instance of copper, nickel or silver, and then attaching the current-supply and electrode wires to the coating by soldering with tin, the particular method of electrode and wire attachment being not essential to the invention proper.

The semiconductor member 3 may be cemented or otherwise fastened to the pole structure of the machine. Its orientation is such that the current axis, defined by the direction of spacing between the terminals 4 and 5, extends parallel to the axis of the armature 1, while the electrodes 6 and 7 are located on a transverse radial plane of the armature. When the semiconductor is traversed by current flowing between the circuit points 14 and 15, and this current is proportional to the load current of the machine, the Hall voltage generated between electrodes 6 and 7 under the effect of the magnetic field of the machine is proportional to the torque of the machine; and this voltage, appearing across circuit points 14 and 15, is applied to a measuring control or regulating device according to any of the embodiments described below.

According to Fig. 2, the machine has its field poles energized by a field winding 8, shunt-connected across the armature through an adjusting rheostat 9. The terminal points 14 and 15 of the semiconductor energizing circuit are connected across a resistor 10 which is series-connected in the load circuit of the machine. Consequently, the voltage drop across resistor 10 is proportional to the load current passing through the armature 1, and the shunt current flowing through the semiconductor member 3 between its terminals 4 and 5 is likewise proportional to the load current. The terminal points 16 and 17 of the Hall electrode circuit are shown connected to a measuring instrument 11.

With direct-current high-voltage machines it is not desirable to apply the high-voltage potential of the load circuit to the semiconductor member and thus to the devices controlled by the Hall voltage of that member. In such cases, the semiconductor circuits can be electrically isolated from the load circuit, for instance, by applying a direct-voltage transforming device as exemplified by the embodiment shown in Fig. 3.

According to Fig. 3, the load circuit 24 of the machine is inductively linked with a reactor 23 so that the iron core of the reactor is premagnetized by unidirectional flux proportional to the direct current of the load circuit. The winding 25 of the reactor is energized by an alternating-current source 26 of constant voltage. The circuit of winding 25 includes a full-wave rectifier 27 whose output terminals are connected across the terminals 4 and 5 of the semi-conductor member 3 arranged in the magnetic field of the machine as explained above with reference to Fig. 1. The alternating current flowing from source 26 through reactor winding 25 and rectifier 27 varies in proportion to the direct-current premagnetization of reactor 23 and hence in proportion to the load current of the machine. The rectified current flowing from rectifier 27 through semiconductor 3 thus also depends proportionately upon the load current of the machine with the result that the Hall voltage available at terminals 16 and 17 for measuring, controlling or other purposes is again a measure of the torque developed by the machine. In this embodiment there is no conductive connection between the high-voltage circuit 24 of the machine and the sensing circuits and all electric devices associated therewith.

For obtaining a response indicative of the machine torque it is not always necessary to utilize the load current of the machine in the manner so far described. In direct-current series-field machines, the armature voltage of the machine is proportional to the load current, particularly in the lower, substantially linear portion of the magnetic characteristic. Consequently, the armature voltage of such a machine may also be used for passing current through the semiconductor member. Analogously, any other operating magnitude that is dependent upon the load current of the machine, such as the voltage drop in an interpole winding, may also, be applied for supplying or controlling the current through the semiconductor member.

The invention can also be used to measure or represent the torque of alternating current machines and multiphase machines. To this end the semiconductor is arranged within the air gap of the machine and is supplied with a current proportional to the load current. In alternating-field machines, such as in single-phase energized series or shunt motors for instance, the torque of the machine is proportional to the product of the load current, the machine field and the phase displacement angle $\varphi$. Consequently, if the semiconductor member is arranged in the air gap of the machine, and hence is traversed by the field, and if the current passed through the semiconductor member is equal in phase position to the load current of the machine and proportional to its magnitude, then the generated Hall voltage will be directly proportional to the torque of the machine. In multiphase machines the field also varies its position in space and passes as a rotating field by the semiconductor member located in the air gap. Consequently, care must be taken that at the semiconductor member the field and the load current manifest themselves in the correct phase angle relative to each other. This is the case when the semiconductor member is located in the air gap opposite a pole or winding zone whose current flows through the semiconductor member; i. e. when it is substantially perpendicular to the magnetic axis of the particular winding zone. However, the semiconductor member may also be mounted at any chosen location in the air gap if the current acting upon it is displaced by a given angle relative to the load current that produces the Hall-plate current. Then, the influence upon the Hall voltage caused by the phase displacement of the semiconductor member from the correct angular position is compensated by a given time displacement of the current flowing through the semiconductor member.

Fig. 4 of the drawing shows schematically the arrangement along the machine periphery of the three winding zones for the phases I to III of a three-phase winding. The current of the phase I, or a current proportional to the phase current, is passed through the semiconductor member. In this case it is necessary to mount the member 3 in the air gap of the machine, as illustrated, opposite the winding zone I. The torque of the machine is again proportional to the product of the rotating field, the current in the phase I, and the phase displacement angle between these two magnitudes. The largest torque occurs when this angle is equal to zero ($\cos \varphi = 1$), that is, when the rotating field of the machine passes through the air gap at maximum strength at those locations at which the two winding zones I are arranged; the two winding zones having at this time point their maximum instantaneous current. The Hall voltage of the semiconductor member 3 is then proportional to the product of the rotating field and the current of phase I. When a phase displacement occurs between the current of phase I and the rotating field, which is identical with a phase displacement between the currents and voltages supplied from the outside into the machine, then the Hall voltage of semiconductor member 3 decreases in accordance with the resulting reduction in the machine torque, because then the semiconductor member is no longer traversed at that time point by the maximum instantaneous value of the magnetic field at which the current passing through the member has an instantaneous magnitude corresponding to its maximum amplitude.

Fig. 5 of the drawing shows the circuit connection for the arrangement of Fig. 4. The exterior supply lead of phase I comprises a current transformer 30 whose secondary winding produces in the semiconductor measuring body 3, mounted in the air gap of the machine, a current flowing in the direction of the machine axis, for example, so that transversely thereto a Hall voltage can be taken off the out-put leads 16, 17. This Hall voltage is proportional to the torque of the machine.

As mentioned above it is not absolutely necessary that the semiconductor member have a particular angular position relative to the circularly-arranged phase windings. The semiconductor member may also be mounted on any chosen part of the machine periphery within the magnetic gap if it is supplied with a current which is proportional to the load current of the machine and which is variable or adjustable in its phase position relative to a phase position of the machine load current. Then, this adjustment in the phase position of the current flowing through the semiconductor body compensates for the error resulting from the angular displacement of the semiconductor body along the machine periphery from the correct position.

Fig. 6 is a circuit diagram illustrating how this phase adjustment can be made.

According to Fig. 6, the current transformer 31 for energizing the semiconductor member 5 is designed as a rotary-type phase shift transformer. To have the single-phase secondary winding 32 of the transformer vary only the phase but not the magnitude of its voltage as a result of rotary movement, the primary side of the phase shift transformer is given a three-phase design so that all three phases of the load current of the machine pass through the primary transformer windings. In order to secure proportionality between the current in semiconductor member 3 and the load current of the machine, the phase shift transformer must operate without iron saturation. For instance, if the transformer has an iron core, the operating range must correspond to the unsaturated and substantially linear portion of the magnetic characteristic. In making a phase correction, the phase shift transformer 31 can be adjusted, for $\cos \varphi = 1$, until the Hall voltage terminals 16, 17 provide the greatest Hall voltage. If it is not possible to produce a $\cos \varphi = 1$ with the machine, the adjusting of the phase shift transformer may be effected, for instance, in such a manner that when the machine runs at synchronous speed and at no load, the median value of the Hall voltage at terminals 16, 17 is zero. Any load placed upon the machine will then result in a finite value of Hall voltage which indicates the torque of the machine without further change in adjustment of the phase shift transformer.

Fig. 7 shows an embodiment of a motor control system in which a device similar to that described with reference to Fig. 2 is used for limiting the torque of the machine by feed-back control. A semiconductor member 3 is disposed in the air gap between the armature 1 and the field-pole system 2 of the machine. The field system has a shunt-field winding 8 energized through an adjusting resistor 9, and a series-field winding 38. Shown at 40 is an interpole winding also series-connected in the load circuit which further comprises a voltage drop resistor 41. The semiconductor member 3 has its terminals 4 and 5 connected in an energizing circuit across the resistor 41 so that the current flowing through member 3 is proportional to the load current of the machine.

The load circuit of the machine is controlled by the contact 42 of a contactor whose coil 43 is energized from a suitable direct-current source 44 under control by the normally open contact 45 of a control relay. The coil 46 of the relay is connected through a calibrating rheostat 47 across the terminals 16 and 17 of the Hall-electrode circuit of member 3.

When during the operation of the motor the torque exceeds a predetermined value depending upon the selected setting of rheostat 47, relay winding 46 becomes sufficiently energized to close contact 45 so that contactor 43 operates to open contact 42.

As explained in a later place, the power output in the Hall electrode circuit of a device according to the invention can readily be made sufficiently large for directly controlling a sensitive relay. This makes it possible to connect the above-described relay directly to the Hall electrodes without intermediate amplifying devices.

Figure 8:
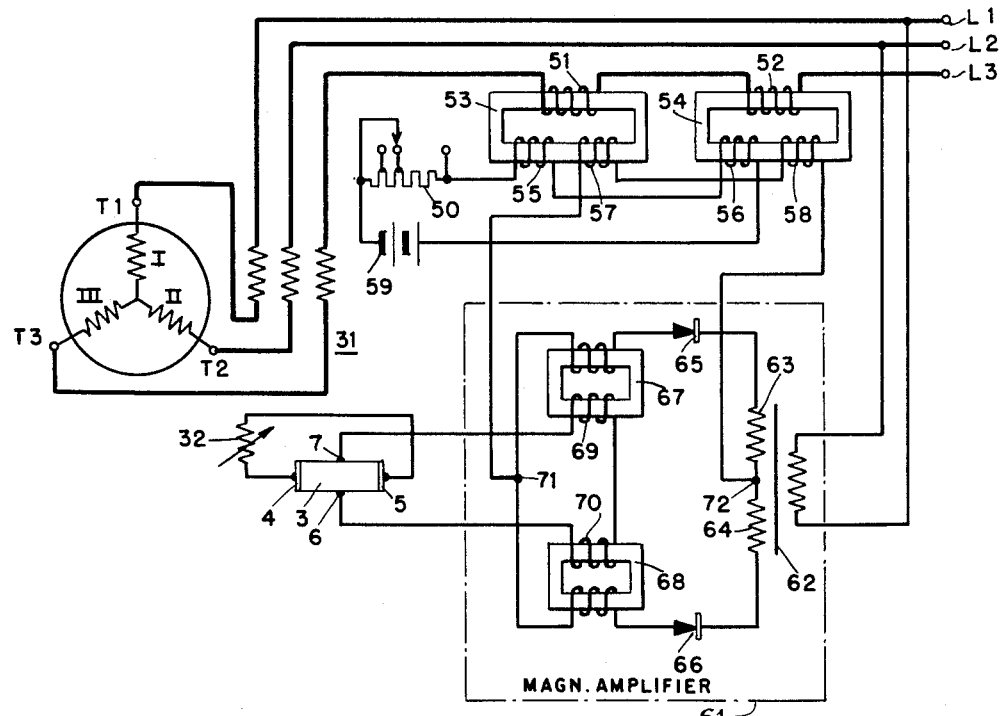
Fig. 8 is a schematic circuit diagram of another control system for a multi-phase induction motor.

Fig. 8 illustrates an example of a torque-responsive control system for an induction motor. The terminals $T_1$, $T_2$, $T_3$ of the motor are connected to respective line terminals $L_1$, $L_2$, $L_3$ through the primary windings of a current transformer 31 according to Fig. 6. The main windings 51 and 52 of two saturable reactors 53, 54 are connected in series between line terminal $L_3$ and motor terminal $T_3$. Two premagnetizing windings 55 and 56 on the cores of respective reactors 53 and 54 are connected to a direct current source 59 of constant bias voltage through a selectively adjustable set of resistors. Two further premagnetizing coils 57, 58 of respective reactors 53 and 54 are serially connected in the output circuit of a magnetic amplifier 61 which receives its input signal from across the Hall electrodes 6 and 7 of the semiconductor member 3 energized from the secondary 32 of the current transformer 31. The magnetic amplifier 61 is energized from across line terminals $L_1$ and $L_2$ through a transformer 62 with two secondary windings 63 and 64. These windings form part of a bridge network which includes two half-wave rectifiers 65 and 66 and the main windings of two saturable reactors 67 and 68 respectively. The reactors 67 and 68 have respective control coils 69 and 70 energized by the Hall voltage generated in semiconductor member 3. The bridge circuit of the magnetic amplifier provides across its terminal points 71 and 72 a direct current which traverses the premagnetizing windings 57 and 58 and has a variable magnitude depending upon that of the Hall voltage impressed upon the input circuit of the amplifier.

When the torque of the machine exceeds a value determined by the setting of rheostat 50, the premagnetization produced by windings 57 and 58 becomes effective to increase the reactive impedance of reactor windings 51, 52 thus reducing the load current and torque of the machine.

While control reactors are shown in only one phase line of the motor, they may also be connected in two or all three phase lines depending upon the particular control effect desired. Systems of this type may be used for instance in hoist control circuits for modifying the speed-torque characteristic of the hoist motor.

As a rule, the proper performance of the above-described devices according to the invention requires making the semiconductor member 3 of a substance whose carrier mobility is higher than about 6000 cm.$^2$/volt second, preferably 10,000 cm.$^2$/volt second or more.

"Carrier mobility" is defined as the velocity of the electric charge carriers within the semiconducting substance in centimeters per second in an electric field of one volt per centimeter. A semiconductor substance may exhibit (n-type) conductance by excess electrons or negative carriers, or (p-type) conductance by defect-electrons (holes) or positive carriers, depending upon the preparative treatment applied to the substance. The type of conductance depends particularly on the choice of small traces of substitutional impurities that are added to, or contained in, the substance and cause lattice defects, i. e. slightly disturb the perfection of the valence-bond structure. The term "carrier mobility" or "mobility" is generic to both types of conductance. That is, either the electron mobility or the hole mobility of the semiconductor material used for the purposes of our invention should have the above-mentioned high value because otherwise the desired effects may stay below technically utilizable magnitudes or may not secure a signal-to-noise ratio sufficient for reliably controlling an amplifier or other alternating-current device. This will be explained presently.

For any given condition of magnetic field strength, current supply in the terminal circuit of the semiconductor member, geometric dimensions and charge-carrier concentration of the semiconductor substance, the Hall voltage increases with the carrier mobility of the substance.

The field strength readily obtainable with an electromagnetic field structure of a machine does not appreciably exceed values in the neighborhood of 17,000 gauss, and the field strength produced by permanent field magnets usually is limited to values in the order of 10,000 gauss, these limitations being due to the saturation characteristic of the ferromagnetic materials.

The magnetic field being thus upwardly limited, the carrier mobility must satisfy certain minimum requirements as follows. When, in a semiconductor, an electron carrying an electric charge $e$ and having a carrier mobility $\mu$, is subjected to an electric field E as produced by the flow of current through the semiconductor, then the electron is subjected to the force $K_{el}=eE$. Under the effect of this force, the electron moves at a velocity $v=\mu E$. If this electron is also subjected to a magnetic field H directed perpendicularly to the electric field, then an additional force is imposed upon the electron perpendicularly to its original direction of motion. This additional force has the magnitude $$K_{magn}=evH=e\mu EH$$

The ratio of the two forces $K_{magn}/K_{el}$ becomes equal to $\mu H$ if $$K_{magn}/K_{el}=\mu H \ll 1$$

That is, as long as the value $\mu H$ is of a smaller order of magnitude than unity, the magnetic effect upon the electric properties of the semiconductor is slight and negligible. On the other hand, this effect is considerable if $$K_{magn}/K_{el}=\mu H \approx 1$$

that is, when the magnetic force is of the same order of magnitude as the electric force so that the value $\mu H$ is approximately equal to unity. Consequently, the value $\mu H = 1$ represents an approximate lower limit for securing practically useful magnitudes of the desired effects.

Reverting now to the above-mentioned field strength value of 17,000 gauss ($=1.7 \cdot 10^{-4}$ volt second/cm.$^2$), the required approximate minimum of carrier mobility (in cm.$^2$/volt second) follows from $1.7 \cdot 10^{-4} \mu = 1$ as $\mu = 6000$ cm.$^2$/volt second. Analogously, the approximate minimum of $\mu$ for a field strength of 10,000 gauss follows as 10,000 cm.$^2$/volt second.

The elementary semiconductor substances heretofore used for transistors, namely silicon and germanium, do not have such a high value of carrier mobility, the best obtainable mobility, namely that of germanium, being about 3000 cm.$^2$/volt second. However, the required high carrier mobilities are available with semiconducting compounds.

A compound, in contrast to a homopolar element, has, aside from its homopolar component, also a heteropolar component due to the chemical difference in the lattice elements. The superposition of homopolar and heteropolar components results in an increase in bonding energy due to the so-called resonance strengthening. This has a favorable effect upon the carrier mobility in those cases where the heteropolar component of a compound is so weak that its detrimental influence upon the electron mobility is not yet noticeable while the strengthening of the bond by the resonance between the homopolar and the heteropolar components is already appreciable.

This applies especially to binary compounds of the type A$_{III}$B$_V$, that is to compounds of an element of the third group in the periodic system with an element of the fifth group. Such compounds are described in the copending application of H. Welker for Semiconductor Devices and Methods of Their Manufacture, Serial No. 275,785, filed March 10, 1952, and assigned to the assignee of the present invention. The compounds of the A$_{III}$B$_V$ type comprise those of an element selected from boron, aluminum, gallium and indium with an element selected from nitrogen, phosphorus, arsenic and antimony. Examples of such compounds are AlN, AlP, AlAs, AlSb, GaN, GaP, GaAs, GaSb, InP, InAs, InSb, Bp. The semiconductor bodies made of these compounds may contain extremely slight traces of substitutional impurities. As a rule, for instance, a trace of tellurium or selenium produces n-type conductance, and a trace of cadmium, zinc or magnesium produces p-type conductance in A$_{III}$B$_V$ compounds. Especially notable among these compounds are InSb and AlSb. With extrinsic semiconductors of these substances, carrier mobilities above 20,000 cm.$^2$/volt second have been attained.

Due to the high carrier mobility, the Hall voltage attains the order of magnitude of 0.1 volt, and since the interior resistance between the Hall electrodes of each individual semiconductor is small, a relatively large power output is secured. For instance, in a device according to the invention, equipped with an InSb semiconductor 10 mm. long, 5 mm. wide, and 0.5 mm. thick, a Hall voltage of 103 mv. and a power output of 5.3 mw. was obtained from the individual semiconductor member, passing through the member a current of 200 ma. and subjecting it to a magnetic field of 10,000 gauss. This explains why the torque-proportional Hall voltage of a device according to the invention can be directly applied to a power consuming circuit such as the relay circuit in Fig. 7, or the input circuit of a power amplifier as exemplified by the magnetic amplifier shown in Fig. 8.

It will be apparent to those skilled in the art upon a study of this disclosure that our invention permits of various modifications and applications other than those specifically described herein, without departing from the essential features of the invention and within the scope of the claims annexed hereto.

We claim:

1. With an electric machine having a magnetic field and an electric load circuit, the combination of a semiconductor member disposed in said field of said machine and having current-supply terminals and Hall electrodes, said terminals being spaced from each other and defining together a current-flow direction transverse to the direction of said field, said electrodes being spaced from each other in a direction transverse to both said current-flow direction and said field direction, condition-responsive electric circuit means connecting said terminals with said load circuit of said machine for passing through said member a current dependent upon an operating magnitude of said load circuit, and voltage-responsive means connected across said electrodes to be impressed by Hall voltage generated between said electrodes, whereby the operation of said voltage-responsive means depends substantially upon the product of said magnitude times the strength of said field.

2. With an electric machine having a magnetic field and an electric load circuit, the combination of semiconductor member disposed in said machine field and having a resistance body formed of a crystalline compound of a carrier mobility above 6000 cm.$^2$/volt second, said member having current-supply terminals and Hall electrodes on said body, said terminals being spaced from each other and defining together a current axis transverse to the direction of said field, said electrodes being spaced from each other in a direction transverse to both said current axis and said field direction, condition-responsive electric circuit means connecting said terminals with said load circuit of said machine for passing through said member a current dependent upon an operating magnitude of said load circuit, and voltage-responsive means connected across said electrodes to be impressed by Hall voltage generated between said electrodes, whereby the operation of said voltage-responsive means depends substantially upon the product of said magnitude times the strength of said field.

3. In a combination as set forth in claim 2, said resistance body consisting of a binary compound of indium with an element selected from the group consisting of antimony and arsenic.

4. With an electric machine having a stator and a rotor forming together an annular gap, and a magnetic field traversing said gap, the combination of a semiconductor member having current-supply terminals and Hall electrodes and being disposed in said gap, said terminals being spaced from each other in a direction transverse to that of said field, said Hall electrodes being spaced from each other in a direction transverse to both said field direction and said terminal-spacing direction, current-supply means connected with said terminals for passing current through said member, said current-supply means being joined with said load circuit of said machine to be energized therefrom and having in said member a current substantially proportional to the current of said load circuit, and voltage-responsive means connected across said electrodes to be impressed by Hall voltage generated between said electrodes, whereby the operation of said voltage-responsive means is proportionally dependent upon the torque of said machine.

5. With an electric machine having a stator and a rotor forming together an annular gap, and a magnetic field traversing said gap, the combination of a torque indicating device comprising a semiconductor member having current-supply terminals and Hall electrodes and being disposed in said gap, said terminals being spaced from each other in a direction transverse to that of said field, said Hall electrodes being spaced from each other in a direction transverse to both said field direction and said terminal-spacing direction, current-supply means connected with said terminals for passing current through said member, said current-supply means being joined with said load circuit of said machine to be energized therefrom and having in said member a current substantially proportional to the current of said load circuit, and a voltage-measuring device connected with said electrodes for indicating the Hall voltage generated between said electrodes, whereby the indication of said device is proportional to the torque of said machine.

6. With an electric machine having field pole structures and an armature forming together a magnetic circuit and having a magnetic pole-flux path passing from each pole structure through said armature, said machine having a load circuit inductively linked with said armature, in combination, torque-responsive sensing means comprising a semiconductor member having current-supply terminals and Hall electrodes, said terminals defining in said member a current axis and said electrodes being spaced from each other in a direction transverse to said current axis, said member being disposed in said flux path with said axis and said direction extending transverse to said path so that said member is traversed by magnetic induction proportional to the pole flux of said machine, circuit means connected with said load circuit and connected across said terminals for passing through said member a current proportional to the load current of said machine, and an output circuit connected across said electrodes to be impressed by Hall voltage generated between said electrodes, whereby said voltage varies in proportion to the torque of said machine.

7. With a rotating-field machine having multi-phase windings and a multi-phase load circuit connected to said windings, the combination of a semiconductor member having current-supply terminals and Hall electrodes, said terminals defining in said member a current axis and said electrodes being spaced from each other in a direction transverse to said current axis, said member being disposed in the field of said machine so that its current axis is substantially perpendicular to the magnetic axis of one of said phase windings, electric circuit means connecting said terminals with the one phase of said load circuit that is connected to said one phase winding whereby said member is transversed by current proportional to that flowing through said one winding, and an output circuit connected across said electrodes to be impressed by Hall voltage generated between said electrodes.

8. With an alternating-current machine having a magnetic field and an electric load circuit, the combination of a semiconductor member disposed in said field and having current-supply terminals and Hall electrodes, said terminals being spaced from each other and defining together a current axis transverse to the direction of said field, said electrodes being spaced from each other in a direction transverse to both said current axis and said field direction, an alternating-current circuit connected across said terminals for passing current through said member, adjustable phase-shift means connecting said alternating-current circuit with said load circuit whereby said current through said member is dependent upon the current in said load circuit and has an adjusted phase relation thereto, and an output circuit connected across said electrodes to be impressed by Hall voltage generated between said electrodes.

9. With an electric machine having a magnetic field and an electric load circuit, the combination of a semiconductor member disposed in said field of said machine and having current-supply terminals and Hall electrodes, said terminals being spaced from each other and defining together a current axis transverse to the direction of said field, said electrodes being spaced from each other in a direction transverse to both said current axis and said field direction, condition-responsive electric circuit means connecting said terminals with said load circuit of said machine for passing through said member a current dependent upon the load current of said machine, control means connected in said load circuit for controlling said load current, and electric circuit means connecting said control means with said Hall electrodes for causing control of said load current in response to the Hall voltage generated in said member between said electrodes.

References Cited in the file of this patent

UNITED STATES PATENTS 2,512,325     Hansen _____ June 20, 1950